United States Patent [19]

Login

[11] 4,259,457
[45] Mar. 31, 1981

[54] GRAFT POLYESTERS AND SIZED TEXTILES

[75] Inventor: Robert B. Login, Woodhaven, Mich.

[73] Assignee: BASF Wyandotte Corporation, Wyandotte, Mich.

[21] Appl. No.: 59,695

[22] Filed: Jul. 23, 1979

Related U.S. Application Data

[62] Division of Ser. No. 937,690, Aug. 28, 1978, abandoned.

[51] Int. Cl.$^3$ .................. B05D 3/06; C08L 67/06; D02G 3/00
[52] U.S. Cl. .................................. 525/39; 8/115.6; 204/159.15; 264/137; 427/44; 427/54.1; 427/434.2; 428/375; 428/395; 525/30; 525/32; 525/38; 525/48
[58] Field of Search .................... 525/36, 39, 48; 528/275; 264/137; 8/15.6; 252/8, 6; 427/434.2, 54.1, 44; 428/395, 375; 204/159.15

[56] References Cited

U.S. PATENT DOCUMENTS

| | | | |
|---|---|---|---|
| 2,915,487 | 12/1959 | Shelley | 525/443 |
| 3,629,169 | 12/1971 | Bedighian | 528/45 |
| 3,981,836 | 9/1976 | Pangle, Jr. et al. | 260/29.6 H |
| 4,002,700 | 1/1977 | Fukuzaki et al. | 528/275 |

*Primary Examiner*—J. Ziegler
*Attorney, Agent, or Firm*—Andrew E. Pierce

[57] ABSTRACT

There are disclosed graft polyesters useful as adhesives and coatings and especially useful in processes for sizing spun and continuous filament synthetic organic and inorganic fibrous yarn. One embodiment of the invention is a textile size composition having free carboxyl groups which is prepared in situ on a textile yarn by the application of heat or radiation to a mixture of an unsaturated polyester reactant and a monovinyl monomer reactant comprising an acidic monovinyl monomer having at least one carboxyl group or mixtures thereof with any monovinyl monomer. Desizing can be accomplished by partial neutralization of the size to a pH of at least 6 by reacting the size with a base to render the graft polyester water-dispersible or water-soluble.

The graft polyester compositions of the invention are especially useful as size compositions since they can be applied to the yarn from a solventless mixture and require only at least one of the application of heat or irradiation to graft polymerize the size in situ on the yarn. The graft polyester of the invention comprises the reaction product of (1) an unsaturated polyester which is the reaction product of at least one polycarboxylic acid reactant, preferably a dicarboxylic acid reactant and at least one polyhydric alcohol reactant, preferably a diol, wherein a minor effective proportion of at least one of said reactants is $\alpha,\beta$-ethylenically unsaturated with (2) at least one monovinyl monomer reactant comprising at least one acidic monovinyl monomer containing at least one carboxyl group or a mixture of said vinyl monomer with any monovinyl monomer.

Alternatively, where water-insolubility is desired in the graft polyester under both acid and basic conditions, a polyunsaturated vinyl monomer is utilized having two or more vinyl groups per molecule. The graft polyesters of the invention prepared using monovinyl monomers also can be reacted with cross-linking resins, such as aminoplast resins, to confer water-insolubility under both basic and acid conditions.

3 Claims, No Drawings

GRAFT POLYESTERS AND SIZED TEXTILES

This is a division of application Ser. No. 937,690, filed Aug. 28, 1978 now abandoned.

BACKGROUND OF THE INVENTION
1. Field of the Invention

This invention relates to novel polyester compositions, sizing compositions, and processes for sizing yarn utilizing said compositions as binders or coatings for fibrous articles such as spun or continuous filament textile yarn.

2. Description of the Prior Art

Prior to the weaving operation, continuous filament synthetic fiber warp yarn is usually given a twist of about 5 to 15 turns per inch and treated with a sizing composition which binds the filaments of the yarn together so as to strengthen the yarn by rendering it more resistant to abrasive forces to which it is exposed during the subsequent weaving operation. Sizing materials must confer on the yarn resistance to abrasion as well as provide additional properties such as elasticity, flexibility, and low tack. In addition, the size must be easily removed subsequent to the weaving operation in order to return the yarn to its unsized state in which dying treatments are often performed.

Textile sizing compositions are commonly applied to textile fibers from water dispersions. In U.S. Pat. No. 3,981,836, it is disclosed that a suitable size can be prepared by copolymerizing a styrene-maleic anhydride copolymer in the presence of an unsaturated dicarboxylic acid and a monohydric or polyhydric alcohol. The composition can be converted to a water-dispersible polymer by neutralizing some of the carboxyl groups of the resulting copolymer with an alkali metal hydroxide or ammonium hydroxide.

It is also known from U.S. Pat. No. 4,002,700 to prepare compositions useful as adhesives, coatings, printing inks and binders by reacting a dibasic acid component containing an $\alpha,\beta$-ethylenically unsaturated dibasic acid with a glycol to form an unsaturated polyester which is reacted with a base to neutralize unreacted carboxyl groups and render the polyester water soluble. The water-soluble polyester can be cured utilizing a monovinyl compound subsequent to application to a substrate.

SUMMARY OF THE INVENTION

It has now been discovered that a novel unsaturated polyester useful for sizing synthetic textile yarns or blends thereof with natural fibers, particularly yarn containing spun or continuous filament polyester yarn, can be prepared, in one embodiment of the size of the invention, by first preparing an unsaturated polyester by reacting at least one dicarboxylic acid reactant selected from the group consisting of a dicarboxylic acid, a corresponding dicarboxylic acid anhydride, dicarboxylic acid esters, their corresponding acyl halides or mixtures thereof. A minor effective proportion, generally about one to about ten mole percent, preferably about 2 to about 8 mole percent of said dicarboxylic acid reactant, based upon 100 mole total percent, is an $\alpha,\beta$-ethylenically unsaturated dicarboxylic acid reactant. This is reacted with 100 moles total percent of a polyhydric alcohol, preferably a diol or mixtures thereof with a polyhydric alcohol having a functionality greater than two. The unsaturated polyester obtained is thereafter blended with about 20 to about 200 percent by weight of a monovinyl monomer reactant based upon the weight of the unsaturated polyester, said monomer comprising at least one acidic monovinyl monomer containing at least one carboxyl group.

Alternatively, said polyester can be prepared utilizing as a proportion of said polyhydric alcohol a minor effective amount of an $\alpha,\beta$-ethylenically unsaturated polyhydric alcohol or a minor effective proportion of both said dicarboxylic acid reactant and said polyhydric alcohol reactant, $\alpha,\beta$-ethylenically unsaturated acid and alcohol reactants. General and preferred proportions are the same as those disclosed above.

By the incorporation by blending of at least one monovinyl monomer comprising at least one acidic monovinyl monomer having at least one carboxyl group into the unsaturated polyester, grafting can take place upon reaction in situ of the unsaturated polyester with said vinyl monomer subsequent to application of the size on the fiber. In this manner, a grafted polymer chain with free-carboxylic groups is added to the unsaturated polyester chain backbone. Sufficient free carboxyl groups are thereby provided in the polyester such that upon neutralization or partial neutralization with a base, a water-soluble or water-dispersible polyester size composition results. This permits the polyester size composition to be readily removed subsequent to the weaving operation.

The size composition can be applied to glass fibers which are subsequently utilized as reinforcing fillers in the preparation of plastic articles especially those prepared from unsaturated polyesters, in order to improve the physical properties of the resulting plastic articles.

The unsaturated polyester compositions of the invention are useful generally in the preparation of adhesives, binders, coatings and printing inks.

DETAILED DESCRIPTION OF THE INVENTION

The invention relates to novel graft polyesters and size compositions preferably for sizing hydrophobic synthetic yarns or blends thereof with natural yarns, said sizing composition being especially adapted for reaction in situ. The composition is deposited on a yarn or fiber preferably at a temperature of about ambient temperature up to about 150° C. without utilizing volatile solvents. The use of a blend of an unsaturated polyester with at least one monovinyl monomer which about 30 to about 100 mole percent of said vinyl monomer contains at least one carboxyl group allows the application of the composition to a substrate without the use of volatile solvents. Subsequent graft polymerization in situ provides a sized fiber. Because said size composition contains a sufficient number of free-carboxyl groups, partial or complete neutralization of the size composition with a base confers water-dispersibility or water-solubility upon the size and thus allows the size to be easily removed from the fiber subsequent to the weaving process. Methods of sizing hydrophobic synthetic yarns, sized yarns and processes for the preparation of said sizing composition are also disclosed.

In accordance with the present invention, graft polyesters are prepared by the in situ graft polymerization of a monovinyl monomer having at least one carboxyl group with an unsaturated polyester, said graft polymerization preferably being carried out by exposure to at least one of radiation or a temperature of about 80° C. to about 200° C. in the presence of a free-radical generating initiator. The unsaturated polyesters which can be employed in the preparation of the sizing compositions of the invention are those which contain reactive α,β-ethylenic unsaturation derived from at least one of dicarboxylic acids containing α,β-ethylenic unsaturation and polyhydric alcohols or polyols containing α,β-ethylenic unsaturation.

The unsaturated polyesters of this invention can be prepared by standard procedures. Typically, such procedures involve the reaction of dicarboxylic acids (or diesters, anhydrides, etc., thereof) with polyhydric alcohols in the presence of an acid catalyst, for instance, antimony trioxide or an organic titanate, such as tetrabutyl titanate, utilizing heat and reduced pressure as desired. Normally, an excess of the volatile polyhydric alcohol is supplied and removed by conventional techniques in the latter stages of polymerization. To protect the polyester from oxidation, an antioxidant such as a hindered phenol can be added to the reaction mixture.

Useful unsaturated dicarboxylic acid reactants which can be employed in the preparation of the unsaturated polyester include both aromatic and aliphatic acids which are reactive under conditions of free radical graft polymerization and generally are α,β-ethylenically unsaturated dicarboxylic acids or their corresponding dicarboxylic anhydrides, esters and acyl halides. These include, for example, maleic acid, fumaric acid, p-carboxycinnamic acid, itaconic acid, etc. Most of these acids are α,β-dicarboxylic as well as α,β-ethylenically unsaturated.

The α,β-ethylenically unsaturated dicarboxylic acids can be utilized in combination with saturated dicarboxylic acids. Representative saturated dicarboxylic acid reactants include both aromatic and aliphatic acids including cycloaliphatic dicarboxylic acids and corresponding anhydrides or esters, for example, phthalic, terephthalic, isophthalic, oxalic, malonic, succinic, glutaric, 2,2-dimethylglutaric, adipic, pimelic, azelaic, sebacic, 1,3-cyclopentane dicarboxylic, 1,2-cyclohexane dicarboxylic, 1,3-cyclohexane dicarboxylic, 1,4-cyclohexane dicarboxylic, 2,5-norbornane dicarboxylic, 1,4-naphthalic, diphenic, 4,4-oxydibenzoic, 4,4'-sulfonyl dibenzoic, diglycolic, thiodipropionic, and 2,5-naphthalene dicarboxylic acids.

Because of their known contribution to film strength in polyesters, the aromatic diacids such as isophthalic acid or terephthalic acid are preferred saturated aromatic diacids. Suitable mixtures of these dicarboxylic acids can be utilized to obtain desired modifications of physical properties in the polyester size composition of the invention as is well known by those skilled in the art. The corresponding esters and acyl halides of the above enumerated dicarboxylic acids can also be used in preparing the novel polyester size compositions of the invention. Examples of representative dicarboxylic acid esters include dimethyl 1,4-cyclohexanedicarboxylate, dimethyl 2,6-naphthalenedicarboxylate, dibutyl 4,4'-sulfonyldibenzoate, dimethyl isophthalate, dimethyl terephthalate, and diphenyl terephthalate. Acyl halides are characterized by the general formula RCOX, wherein R is aliphatic, aromatic or cycloaliphatic and X is chlorine. Examples of useful compounds are: terephthaloyl dichloride, isophthaloyl dichloride, malonyl dichloride, itaconyl dichloride. Copolyesters can be prepared from two or more of the above dicarboxylic reactants or derivatives thereof.

The polyhydric alcohols which are useful in the preparation in the unsaturated polyesters of the invention can be diols or mixtures of diols with hydroxyl-containing compounds having a functionality greater than two but are preferably diols having 2 to 8 carbon atoms for example, ethylene glycol; propylene glycol; 1,3-propanediol; neopentyl glycol; 2,4-dimethyl-2-ethylhexane-1,3-propanediol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; 1,2-cyclohexanedimethanol; 1,3-cyclohexanedimethanol; and bis(hydroxyethyl) hydroquinone.

The unsaturation in the unsaturated polyesters of the invention can be obtained using mixtures of α,β-ethylenically unsaturated dicarboxylic acid reactants and polyhydric alcohols or polyols, or solely by the incorporation of an α,β-ethylenic unsaturation-containing dicarboxylic acid, polyhydric alcohol or polyol as a reactant in the preparation of the polyester. A minor effective amount of unsaturation-containing reactant is used, generally about 1 to about 10 mole percent, preferably about two to about eight mole percent of α,β-ethylenically unsaturated polyhydric alcohol or dicarboxylic acid based upon 100 mole percent of said polyhydric alcohol or said acid is utilized in the preparation of the unsaturated polyester of the invention. Where blends of unsaturated dicarboxylic acid reactant and unsaturated polyhydric alcohol reactant are used, a minor effective amount of unsaturated alcohol is used, generally about 1 to about 10 mole percent, preferably about one to about four mole percent of each of said unsaturated alcohol and acid in the mixture based upon 100 mole percent of each acid and alcohol reactant will be α,β-ethylenically unsaturated acid or alcohol reactants.

The α,β-ethylenic unsaturation-containing polyol which can be utilized as a portion of the polyhydric alcohol reactant can be prepared by the reaction of any conventional polyol with an organic compound having both α,β-ethylenic unsaturation and a hydroxyl, carboxyl or epoxy group. Alternatively, the polyols can be prepared by employing as a reactant in the preparation of the polyol a compound having both α,β-ethylenic unsaturation and a hydroxy, carboxyl or epoxy group.

A representative listing of organic compounds from which compounds useful in the preparation of the α,β-ethylenic unsaturation-containing polyol can be selected by one skilled in the art include α,β-ethylenically unsaturated polycarboxylic acids and anhydrides such as maleic acid and anhydride, fumaric acid and anhydride, crotonic acid and anhydride, propenyl succinic anhydride, and halogenated maleic acids and anhydrides, unsaturated polyhydric alcohols such as 2-butene-1,4-diol, glycerol allylether, trimethlolpropane allylether, pentaerythritol allylether, pentaerythritol vinylether, pentaerythritol diallylether, and 1-butene-3,4-diol, unsaturated epoxides such as 1-vinylcyclohexane-3,4-epoxide, butadiene monoxide, vinyl glycidylether (α-vinyloxy-2,3-epoxy propane), glycidyl methacrylate and 3-allyloxypropylene oxide (allyl glycidyl-ether). If a polycarboxylic acid or anhydride is employed to incorporate the required unsaturation into the polyols so as to provide terminal carboxyl groups, it is then necessary to react the unsaturated polyol with an alkylene oxide, preferably ethylene or propylene oxide, to replace the carboxyl groups with hydroxyl groups prior to employment in the present invention.

To prepare α,β-ethylenic unsaturation-containing polyols useful in the present invention, from about 0.1 mole to about 3.0 moles, preferably from 0.30 mole to 1.5 moles, of said unsaturated organic compound per mole of polyol is employed. Polyols containing relatively low unsaturation can also be prepared by blending a high unsaturation-containing polyol with a polyol which is free of $\alpha,\beta$-ethylenic unsaturation. If a blend of polyols is employed, the amount of unsaturation should fall within the range stated above. The preparation of unsaturation-containing polyols employed in the present invention follows conventional prior art procedures such as disclosed in U.S. Pat. No. 3,275,606 and U.S. Pat. No. 3,280,077, incorporated herein by reference. Generally this requires a reaction at a temperature between 0° C. and 150° C. Both acidic catalysts, such as Lewis acid catalysts and basic catalysts such as alkali metal hydroxides, may be used. In addition, a non-catalyzed reaction may be used employing temperatures between 50° C. and 200° C. It is, of course, understood that the resulting polyols are a cogeneric mixture of polyols and not a single molecular structure.

Representative saturated polyols which can be employed in the preparation of the unsaturated polyester reactant components of the unsaturated polyester-vinyl monomer size composition of the invention and in the preparation of the unsaturation-containing polyols which can be employed in the present invention are well known in the art. They are often prepared by the catalytic condensation of an alkylene oxide or mixture of alkylene oxides either simultaneously or sequentially with an organic compound having at least two active hydrogen atoms such as taught by U.S. Pat. Nos. 1,922,451; 3,190,927 and 3,346,557, incorporated herein by reference.

Representative saturated polyols include polyhydroxyl-containing polyesters, polyalkylene polyether polyols, polyhydroxy-terminated polyurethane polymers, polyhydroxyl-terminated polycaprolactone polyesters, and alkylene oxide adducts of polyacetals, and aliphatic polyols. Generally the equivalent weight of the polyols will vary from 500 to 20,000, preferably from 1000 to 5000.

Any suitable hydroxyl-containing polyester (polyester polyol) can be used such as are obtained from polycarboxylic acids and polyhydric alcohols. Any suitable polycarboxylic acid can be used such as oxalic acid, malonic acid, succinic acid, glutaric acid, adipic acid, pimelic acid, suberic acid, azelaic acid, sebacic acid, maleic acid, fumaric acid, flutaconic acid, $\alpha$-hydromuconic acid, $\beta$-hydromuconic acid, $\alpha$-butyl-$\alpha$-ethyl-glutaric acid, $\alpha,\beta$-diethylsuccinic acid, isophthalic acid, terephthalic acid, hemimellitic acid, and 1,4-cyclohexane-dicarboxylic acid. Any suitable polyhydric alcohol including both aliphatic and aromatic containing aliphatic alcohols may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, $\alpha$-methyl glucoside, pentaerythritol, and sorbitol. Also included with the term "polyhydric alcohol" are compounds derived from hydroxyethyl phenol such as 2,2-bis(4-hydroxy-ethyl phenyl)propane, commonly known as ethoxylated Bisphenol A.

The hydroxyl-containing polyester can also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyalkylene glycol (polyether polyol) can be used as the polymerization product of an alkylene oxide or of an alkylene oxide with a polyhydric alcohol having about 2 to about 6 hydroxyl groups. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols can be prepared from other starting materials such as tetrahydrofuran and alkylene oxide tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having about two to about six carbon atoms such as polyethylene ether glycols, polypropylene ether glycols, and polybutylene ether glycols. The polyalkylene polyether polyols may be prepared by any known process such as, for example, the process disclosed in the *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)propane and blends thereof having equivalent weights of from 250 to 5000.

The monovinyl monomer which can be employed in the preparation of the water-dispersible or water-soluble graft polyester size compositions of the invention is present in a major effective amount, generally about 20 to about 200 percent by weight based upon the weight of the unsaturated polyester used. Preferably about 50 to about 150 percent by weight of said vinyl monomer is utilized. Said vinyl monomer contains only one vinyl group in the monomer and comprises (1) at least one acidic monovinyl monomer having at least one carboxyl group or (2) mixtures thereof with any monovinyl monomer. Where cross-linked, water-insoluble polyesters are desired, even under basic aqueous conditions, polyunsaturated vinyl monomers are substituted for said acidic monovinyl monomer. Useful monovinyl monomers and polyunsaturated vinyl monomers contain free radical initiated polymerizable $\alpha,\beta$-ethylenic unsaturation and are reactive with and compatible with, preferably solvents for, the unsaturated polyester of the invention. A representative listing of vinyl monomers from which useful monomers can be selected by one skilled in the art includes styrene, $\alpha$-methylstyrene, methylstyrene, 2,4-dimethyl-styrene, ethylstyrene, isopropylstyrene, butylstyrene, cyclohexylstyrene, benzylstyrene, and the like, substituted styrenes such as chlorostyrene, 2,5-dichlorostyrene, bromostyrene, fluorostyrene, trifluoro-methylstyrene, iodostyrene, cyanostyrene, nitrostyrene acetoxylstyrene, methyl 4-vinyl-benzoate, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, isopropyl methacrylate, octyl methacrylate, methacrylonitrile, methyl α-chloroacrylate, ethyl α-ethoxyacrylate, methyl α-acetaminoacrylate, butyl acrylate, ethyl acrylate, 2-ethylhexylacrylate, α-chloroacrylonitrile, and the like; the vinyl esters, vinyl ethers, etc., such as vinyl acetate, vinyl chloroacetate, vinyl butyrate, vinyl formate, vinyl methoxy acetate, vinyl benzoate, vinyl iodide, vinyl toluene, vinyl naphthalene, vinyl bromide, vinyl chloride, vinyl fluoride, vinylidene bromide, vinylidene chloride, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, vinyl phosphonates such as bis(β-chloroethyl)vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, N-vinyl pyrrole, and the like; dimethyl fumarate, dimethyl maleate, monomethyl itaconate, t-butylaminoethyl methacrylate, dimethylaminoethyl methacrylate, glycidyl acrylate, and the like. Any of the other known vinyl monomers reactive under free radical initiation can be used as would be apparent to one skilled in the art. The compounds listed above are illustrated and not restrictive of the monomers suitable for use in this invention.

A representative listing of initiators for free radical initiated polymerization from which useful initiators can be selected by one skilled in the art includes the peroxides, i.e., diacylperoxides, ketone peroxides, hydroperoxides, sulfonylperoxides, alkylperoxides, percarbonates, i.e., peroxydicarbonates, azo compounds, and others such as peroxyesters and peroxyketals and specific initiators including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, peramethane hydroperoxide, diacetyl peroxide, di-α-cumyl peroxide, dipropyl peroxide, diiso-propyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, α-methyl-α-ethylbenzyl hydroperoxide, Tetralin hydroperoxide, triphenylmethyl hydroperoxide, diphenylmethyl hydroperoxide, α-β-azo-2-methyl butyro-nitrile, α-α'-2-methyl heptonitrile, 1,1'-azo-1-cyclohexane carbonitrile, dimethyl-α, α'-azoisobutyrate, 4,4'-azo-4-cyanopentanoic acid, azobis(isobutyronitrile), persuccinic acid, diisopropyl peroxy dicarbonate, and the like; a mixture of catalysts may also be used. Many other useful catalysts are disclosed in *Organic Peroxides* by A. V. Tovolsky and R. B. Mesrobian, Interscience Publishers, 1954, pages 158–163. These initiators form free radicals by cleavage of the peroxide linkage or other mechanism with heating or radiation or by the action of accelerators or promoters in combination with heating or radiation at lower temperatures.

The most common accelerators are cobalt salts and tertiary diamines. Vanadium salts as well as quaternary ammonium salts are also used. Representative examples of accelerators from which useful accelerators can be selected by one skilled in the art are N,N-dimethylaniline, N,N-dimethyl-p-toluidine, N,N-dimethyl-p-toluidine, cobalt naphthanate, lauryl mercaptan, cobalt octoate, and vanadium acetylacetonate. The graft polymerization process of the subject invention is generally carried out at temperatures of about 80° C. to about 200° C., preferably from about 80° C. to about 150° C. Generally from about 0.05% to about 5% by weight of initiator based on the weight of the monomer and unsaturated polyester will be employed in the process of the invention.

The free carboxyl group-containing polyester size compositions of the invention are particularly suited for use in sizing fibers which are to be woven on a water jet loom. In this textile yarn sizing application, the size which is present on the fibers during the weaving process is water insoluble but subsequently, the sizing can be rendered easily removable by neutralization or partial neutralization of the size during conventional desizing and scouring treatments wherein an aqueous base is utilized such as sodium and potassium hydroxide, an amine, or sodium and potassium carbonate, both with or without surfactants. Generally suitable bases include ammonia, the alkali metal hydroxides and carbonates and bicarbonates as well as amines such as the tri(lower alkyl) amines ($C_1$–$C_6$) illustrated by triethylamine and trimethylamine. Other useful amines include triethanolamine and morpholine.

The hydroxyl-containing component of the polyester which is a polyhydric alcohol such as an alkylene glycol or a polyester polyol or a polyether polyol, is preferably a diol. However, the hydroxyl-containing component of the unsaturated polyester of the invention can also include a minor amount, preferably up to 20 mole percent of a polyhydric alcohol having a functionality greater than two such as polyester or polyether polyol containing more than two (2) hydroxyl groups per molecule as determined by the average of the hydroxyl groups per molecule. Such hydroxyl-containing compounds are well known in the art and are represented by compositions listed above. Where it is desirable to include a polyol having a functionality greater than two as part of the hydroxyl-containing component of the polyester of the invention, it is generally necessary to add a compensating amount of a monofunctional acid such as stearic or benzoic acid in order to avoid gelation early in the polymerization as predicted by the Carothers Equation.

The dicarboxylic acid reactant can also include a minor amount of a polycarboxylic acid reactant having a functionality greater than two. Thus, preferably up to 20 mole percent of such a polycarboxylic reactant can be used to replace a portion of the dicarboxylic acid reactants. Representative polycarboxylic acid reactants having a functionality greater than two are well known in the art. They include such acids as trimellitic acid, hemimellitic acid, trimesic acid, 1,2, 3,4-benzene tetracarboxylic acid and the corresponding anhydrides thereof where they exist. Where it is desired to include a polycarboxylic acid component having a functionality greater than two as part of the dicarboxylic acid reactant component of the polyester of the invention, it is necessary to add a compensating amount of a monofunctional alcohol such as ethanol or propanol in order to avoid low molecular weight products and gelation early in the polymerization as predicted by the Carothers Equation. Such polyfunctional reactants can also be added at the end of the condensation reaction to produce the unsaturated polyester of the invention without serious gelation effects. In this case, a compensating monofunctional alcohol would not be required.

The novel graft polyester compositions of the invention containing free carboxyl groups are particularly useful in the sizing of synthetic organic fibers and blends thereof with natural fibers, particularly the sizing of textile yarn prior to weaving. In addition, the sizing of glass fibers and filaments is accomplished using said graft polyesters. For instance, the synthetic organic fibers such as the hydrophobic fibers illustrated by polyacrylics, polyamides and polyester fibers, for instance, those prepared from linear polyesters such as poly(ethyleneterephthalate) are effectively sized either alone or in blends with other natural and synthetic organic fibers.

The graft polyester size compositions of the invention are particularly suited for the sizing of textile yarn since they exhibit excellent adhesion to synthetic fibers as exemplified by those fibers listed above. It is therefore intended to replace the use of such prior art sizing compounds as polyvinyl alcohol and carboxymethyl cellulose as well as other prior art water-soluble linear saturated polyester size compositions, for instance, those containing sulfonate groups in the polyester chain. As is well known, synthetic, organic, hydrophobic fibers such as polyesters are characterized by their lack of reactive sites in the molecular structure which would permit extensive hydrogen bonding to take place and thus facilitate adhesion of a size to the fiber, as is the case with nylon and rayon fibers. Thus, because of its excellent adhesion properties, the graft polyester size of the invention is particularly suited for use in sizing polyester fibers alone or in blends with spun or continuous filament fibers of cellulose acetate, polyacrylics, viscose rayon, as well as natural fibers such as cotton and wool.

The unsaturated polyester-vinyl monomer size compositions of the invention when used as glass fiber sizing compositions also can be grafted in situ and applied to the glass fibers during their formation. Such sizing particularly suits such fibers for incorporation into molding compounds as reinforcing materials. As disclosed in U.S. Pat. No. 3,936,285, water-based sizing compositions are applied to the glass filaments as they are formed by drawing and the strand of glass fibers, which consists of gathered fibers, is then wound on a forming package. Subsequently, the forming package is dried in an oven and it is during this drying stage that the solids of the water-based sizing composition have a tendency to migrate from the inside of the package to the outside of the package as the water contained in the sizing composition is volatilized. The sizing compositions of the invention are useful in the sizing of glass fibers during formation of the fibers as there is little or no tendency of the sizing to migrate subsequent to application to the glass strands since the sizing compositions of the invention are applied without the use of solvent and hardening of the composition by graft polymerization can take place subsequently either by at least one of the application of heat or exposure to irradiation. Because of the chemical similarity of the sizing compositions of the invention to resin matrices utilized in combination with glass fibers where glass fibers are utilized to reinforce a molded article, that is, an unsaturated polyester resin as the resin matrix, the sized fiber demonstrates excellent adhesion to the resin matrix which can result in improved physical properties in the molded article.

The unsaturated polyester-vinyl monomer size compositions of the invention, in addition to being hardened, or grafted, by the application of heat, can be hardened by the application of both heat and radiation or radiation alone, particularly ultraviolet radiation where the composition includes an appropriate free radical generating initiator. The graft polyesters of the invention are also suited for adhesive and coating applications including flexible printing ink compositions since the carrier solvents as a part of the coating composition are eliminated. Therefore, in using the graft polyesters of the invention, in such applications as printing inks for lithography, organic solvent vapors are not evaporated into the atmosphere or alternatively, extensive solvent recovery equipment is not employed to prevent such air pollution. In addition to the radiation hardening of the graft polyester-vinyl monomer compositions of the invention utilizing ultraviolet radiation, said compositions of the invention are curable upon exposure to ionizing radiation, that is, that radiation created by the emission of electrons or highly accelerated nuclear particles such as neutrons, alpha particles, etc.

In order to evaluate the adhesive strength of the graft polyester size of the invention, two pieces of 20 mil poly(ethylene terephthalate) sheeting measuring one inch by three inches are overlapped to form a one inch square after applying a drop of the graft polyester of the invention which is then placed on another piece of polyester film. The assembly is heated for a period of about one minute at a temperature of 110° C. under a one pound weight so as to bond the two films together. A strongly-adhering coating was obtained.

The tackiness of films of the graft polyester of the invention was evaluated in order to determine the suitability of the compositions as a textile size. Films five mil thick were cast onto 20 mil poly(ethyleneterephthalate) sheeting from blends of an unsaturated polyester and an acidic vinyl monomer as indicated in the examples and the film was evaluated subsequent to graft polymerization in situ and after conditioning for 24 hours at 65 percent relative humidity. Subjective evaluation of tackiness indicated that the films produced were completely free of tackiness.

Since the thorough removal of the size composition from the yarn subsequent to weaving is often of critical importance, it is necessary that a useful size composition exhibit excellent solubility in the ordinarily used dilute caustic desizing solution. The graft polyester size compositions were thus evaluated for solubility in dilute caustic solutions by preparing five mil films of the graft polymerized polyester compositions of the invention which were conditioned for 24 hours under conditions of 70° F. and 65 percent relative humidity. It was found that films made from the graft polyester size compositions of the invention are dispersed or dissolved in dilute caustic solutions but are stable in neutral or acid solutions.

The in situ polymerized graft polyester sizes of the invention can be applied to the yarn as sizes therefor by any convenient means whereby the yarn is contacted with a combination of the unsaturated polyester of the invention and a vinyl monomer. Since the size compositions of the invention are solventless, the required proportion of size can be applied to the textile fiber without the need to evaporate carrier solvents. For instance, the textile yarn can be passed through said unsaturated polyester-vinyl monomer mixture containing a free radical generating initiator, at any convenient linear rate of speed, the mixture being maintained at any convenient temperature so as to provide sufficient fluidity so as to obtain the desired coating weight on the fibers. Generally, application temperatures of about 20° C. to about 150° C., preferably ambient temperature up to about 125° C. are used. The rate of speed at which the fibers are coated by passing them through the mixture comprising the unsaturated polyester-vinyl monomer will be influenced by the means utilized to graft polymerize the vinyl monomer with the polyester subsequent to application to the yarn. For instance, where infrared or conduction or convection heating is utilized, i.e., the coated fibers are passed over oil- or steam-heated drums, it is generally desired to maintain said polyester-vinyl monomer mixture at a temperature of about 80° C. to about 200° C. for about 0.1 minute to about two minutes in order to effect grafting. The time required being a function of the half life of the initiator system used. Alternatively, where radiation, i.e., ultraviolet radiation is used to effect the grafting of the vinyl monomer onto the unsaturated polyester compositions of the invention, greater flexibility in speed of the sizing operation is obtained where an initiator system is selected having a suitable half life upon exposure to ultraviolet radiation.

Generally, a size coating weight or add-on of about three to about ten percent, preferably about four to about eight percent by weight based upon the weight of the fibers is utilized in sizing synthetic organic fibers such as poly(ethyleneterephthalate). Generally, inert additives used in the prior art fiber sizing compositions such as lubricants, plasticizers, softeners, dyes, defoamers, overwaxes, penetrants, hygroscopic agents and stabilizers can be incorporated, where applicable, into the polyester-vinyl monomer sizing compositions of the invention or applied to the fibers as pre- or after-treatments. Such additives which do not interfere with the graft polymerization and are easily removed in the desizing stage are useful.

When it is desired that the graft polyester size remain permanently in the fabric and remain insoluble in water even in the presence of a base, the unsaturated polyester containing a minor effective proportion of at least one of an $\alpha,\beta$-ethylenically unsaturated dicarboxylic acid or polyhydric alcohol reactant can be cross-linked and water-insolubilized even in the presence of a base by contacting it during grafting with a vinyl monomer comprising a polyunsaturated vinyl monomer such as divinyl benzene or ethylene dimethacrylate. Water-insolubilization under basic conditions can also be effected during or after grafting by cross-linking said graft polyester using a cross-linking resin such as an aminoplast, i.e., a phenolformaldehyde, ureaformaldehyde, melamineformaldehyde or methylated ureaformaldehyde resin. For instance, the graft polyester size can be cross-linked subsequent to its deposition on the fibers by passing the sized fiber or fabric through a solution of the cross-linking agent containing a catalyst therefore and subsequently drying and heating to cure, or cross-link, the graft polyester. Such a process is particularly suited to the production of fabrics having permanent creases therein since the final stage in the cross-linking process, that is, the heating and curing stage, can be delayed subsequent to the application of the aminoplast or other cross-linking resin with catalyst to the sized fiber or to the sized fabric. Suitable cross-linking resins are listed above. These are well known in the textile finishing art and their synthesis and selection is within the skill of those persons skilled in the art. Generally, the cross-linking resin is applied by immersing the textile fabric in a solution or dispersion thereof containing 2 to 90 percent by weight of the cross-linking resin, removing the fabric, squeezing excess solution from the fabric, and heating the fabric at cross-linking temperatures of from about 200° to 450° F. and preferably from about 225° F. to about 300° F.

Because the graft polyesters of the invention prepared using monovinyl acidic monomers can be converted from the water-insoluble free-acid form to the water-soluble salt form by reacting said graft polyesters with a base, such compositions find use, in addition to their uses in the textile field, as adhesives in the paper industry to take the place of the so-called repulpable hot-melt adhesives. Use of said graft polyesters as adhesives is particularly advantageous since they can be applied, for instance, as bookbinding adhesives, as solventless mixtures which can be readily hardened, or grafted, by the application of heat or by irradiation as discussed above. The graft polyesters of the invention are particularly advantageous over the prior art hot-melt polyester adhesives which are repulpable in that, generally, little or no heating is necessary to provide fluid mixtures of the unsaturated polyester of the invention and the vinyl monomer. The fluid mixtures can be readily applied to substrates prior to the grafting operation and converted to a solid resinous material which is water-insoluble until reacted with a base during the repulping operation.

The graft polyesters of the invention are prepared using an unsaturated polyester having an acid number which is generally of about 2 to about 40, preferably about 4 to about 20, and most preferably about 7 to about 15. Thus, prior to grafting, the polyester has an acid number such that an effective amount of an acidic monovinyl monomer can be grafted onto the unsaturated polyester to provide carboxylic acid sites sufficient to provide an acid number of about 50 to about 750, preferably about 100 to about 500, and most preferably about 150 to about 300. Upon neutralization or partial neutralization with a base, a water-dispersible or water-soluble size results which is easily removed in the usual textile caustic scour desizing operation. Throughout this specification and claims, when acid number is referred to, it is understood to refer to the number of milligrams of potassium hydroxide necessary to neutralize the non-volatile content of one gram of the unsaturated polyester or the graft polyester of the invention. The molecular weight of the unsaturated polyester of the invention is generally about 3000 to about 15,000, preferably about 4000 to about 10,000 and corresponds to a carboxylic acid number in the unsaturated polyester of about 4 to about 20, preferably about 7 to about 15.

The following examples will further illustrate the nature and method of the preparation of the graft polyester compositions of the invention and their use as sizing compositions for textile fibers. The examples are intended to illustrate the various aspects of the invention but are not intended to limit it. When not otherwise specified throughout the specification and claims, temperatures are given in degrees centigrade and parts, percentages and proportions are by weight.

EXAMPLE 1

An unsaturated polyester of the invention was prepared by charging 558 grams of isophthalic acid, 13.7 grams of maleic anhydride, and 409 grams of diethylene glycol to a two liter resin flask equipped with stirrer, thermometer, and vacuum take-off. The mixture of ingredients was sparged with nitrogen and slowly heated in an oil bath to a temperature of 167° C. After adding four grams of tetrabutyltitanate catalyst, the temperature was slowly increased and condensate first appeared at 185° C. After ten hours, the temperature was slowly raised to 210° C. and 74 percent of the theoretical distillate was collected. The nitrogen sparge was stopped at this point and the reaction mixture was placed under a vacuum of less than 0.1 millimeters of mercury. After six hours under vacuum, the acid number was progressively decreased to 4.1. The viscous syrupy product obtained was decanted onto a Teflon sheet where it cooled to a hard tough resin. Further cooling with dry ice allowed it to be crushed readily into small chunks.

EXAMPLE 2

Utilizing the unsaturated polyester prepared in Example 1, an equal weight of said polyester was mixed with an equal weight of acrylic acid. To this liquid composition was added 2.5 percent by weight based upon the weight of the total mixture of 2,2'-azobisisobutyronitrile as initiator. The homogeneous mixture was liquid at room temperature and of fluid viscosity (Gardner U). In order to test its adhesion to polyester, the mixture was coated onto poly(ethyleneterephthalate) sheeting and placed in an oven preheated to about 120° C. After one minute, the coated sheets were removed and cooled. The liquid coating had formed a tough, elastic, strongly-adhering coating exhibiting no tackiness.

EXAMPLE 3

Utilizing the sizing mixture of Example 2, poly(ethyleneterephthalate) yarn was sized with said mixture by applying the mixture to the yarn utilizing an Atlas replenished drop applicator. The yarn was subsequently heated using infrared radiation, passed around a heated drum maintained at a temperature of 110° C. to about 120° C., and subsequently wound on a take up bobbin. It was found that the sized yarn, after heating approximately 0.5 to about 1 minute subsequent to application to the yarn, was converted to a non-tacky coating suitable as a size.

EXAMPLE 4

Using the size mixture of Example 2, films of about 5 mil thickness were cast on poly(ethyleneterephthalate) sheeting and oven heated as in Example 2 to effect grafting. The assembly was then soaked in water at ambient temperature for 48 hours without apparent change in film characteristics. When these films were placed instead in a dilute aqueous caustic solution, the film was readily dissolved off the sheeting.

EXAMPLE 5

Using the unsaturated polyester of Example 1, an equal weight of said polyester is mixed with methacrylic acid. To this composition there is added 2.5 percent of 2,2'-azobisisobutyronitrile as initiator and the mixture is coated onto poly(ethyleneterephthalate) yarn according to the procedure of Example 3.

EXAMPLES 6-7

Using the procedure and the sizing mixture of Example 3, the size is removed from the fiber by exposing separately the sized fiber to desizing solutions as follows:
aqueous sodium hydroxide—0.1 mol solution
aqueous ammonia—0.5 mol solution

EXAMPLES 8-11

Example 2 is repeated substituting the following initiators for the azo type initiator used in Example 2; benzoyl peroxide, lauroyl peroxide, methyl ethyl ketone peroxide and tertiary butylperoxybenzoate.

EXAMPLE 12

Example 1 is repeated substituting an equal parts by weight mixture of diethylene glycol and ethylene glycol for the diethylene glycol of Example 1.

The embodiments of the invention in which an exclusive property or privilege is claimed are defined as follows:

1. A textile sizing composition for a fibrous textile yarn consisting of a mixture of
  I. an unsaturated polyester comprising the reaction product of:
    (a) at least one polycarboxylic acid reactant comprising (1) a dicarboxylic acid reactant selected from the group consisting of dicarboxylic acids, corresponding dicarboxylic anhydrides, dicarboxylic acid esters, and their corresponding acyl halides or (2) a mixture of said dicarboxylic acid reactant with up to 20 mole percent of a polycarboxylic acid reactant having a functionality greater than two based upon 100 mole percent of said dicarboxylic acid reactant and
    (b) at least one polyhydric alcohol reactant comprising (1) a diol or (2) a mixture of a diol and up to 20 mole percent of a polyhydric alcohol having a functionality greater than two based upon 100 mole percent of said polyhydric alcohol,
  wherein a minor effective proportion of said dicarboxylic acid reactant or polyhydric alcohol reactant is alpha,beta-ethylenically unsaturated with
  II. at least one monovinyl monomer reactant comprising at least one monovinyl monomer having at least one carboxylic group or a mixture of said vinyl monomer with any monofunctonal vinyl monomer
wherein said mixture is capable of being applied to said yarn as a solventless mixture of reactants, which can hardened by the application of heat or radiation, and which can be removed therefrom by neutralization or partial neutralization of said composition.

2. The composition of claim 1 wherein said composition is the reaction product of a saturated aromatic dicarboxylic reactant and an $\alpha,\beta$-ethylenically unsaturated aliphatic dicarboxylic reactant with a diol and said unsaturated polyester has an acid number of about 2 to about 40.

3. The composition of claim 2 wherein said textile sizing composition is the reaction product of isophthalic acid, maleic anhydride, diethylene glycol, ethylene glycol, and acrylic acid.

* * * * *